United States Patent [19]
Gardner

[11] Patent Number: 5,909,060
[45] Date of Patent: Jun. 1, 1999

[54] WAVE ENERGY TRANSFORMER

[75] Inventor: Fred Ernest Gardner, Zwaag, Netherlands

[73] Assignee: Teamwork Techniek B.V. I.O., Purmerend, Netherlands

[21] Appl. No.: 08/669,296

[22] PCT Filed: Dec. 13, 1994

[86] PCT No.: PCT/NL94/00314

§ 371 Date: Aug. 30, 1996

§ 102(e) Date: Aug. 30, 1996

[87] PCT Pub. No.: WO95/17555

PCT Pub. Date: Jun. 29, 1995

[30] Foreign Application Priority Data

Dec. 21, 1993 [NL] Netherlands ............................ 9302230

[51] Int. Cl.⁶ .............................. F03B 13/10; F03B 13/12
[52] U.S. Cl. .................. 290/53; 290/43; 290/44; 290/42; 290/54; 417/330; 417/332; 417/333
[58] Field of Search ................... 290/43, 44, 45, 290/53, 54; 417/330, 331, 332, 333, 334, 337, 343

[56] References Cited

FOREIGN PATENT DOCUMENTS

| | | |
|---|---|---|
| WO9219012 | 11/1992 | European Pat. Off. . |
| 10021189 | 2/1953 | France . |
| 2691506 | 11/1993 | France . |
| 57-183574 | 11/1982 | Japan . |
| 60-035179 | 2/1985 | Japan . |

Primary Examiner—Elvin G. Enad
Attorney, Agent, or Firm—Webb Ziesenheim Logsdon Orkin & Hanson, P.C.

[57] ABSTRACT

An installation for extracting energy from a liquid in which swell occurs relative to a bottom. The installation includes a first and second container for placing at a determined horizontal first mutual distance at least partially under the surface of the liquid, each provided with a closed upper side directed toward the liquid surface, closed side walls and an open underside directed toward the bottom for enclosing a gas under the liquid surface. The gas is bounded to the underside of the container by a quantity of liquid entering via this underside, which quantity of liquid varies as a result of the swell. A transport conduit is provided for transporting gas from the first to the second container and vice versa. A generator responding to the variation in the quantity of liquid in at least one of the containers for generating energy from this variation is also provided.

29 Claims, 11 Drawing Sheets

WAVE ENERGY TRANSFORMER

BACKGROUND OF THE INVENTION

1. Field of the Invention

The invention relates to an installation for extracting energy from a liquid in which swell occurs relative to a bottom.

Such an installation is particularly suitable for use in extracting energy from waves of water at sea.

2. Description of the Prior Art

It is known of waves at sea that they can occur in a wide range of amplitudes and frequencies. Extracting energy from swelling sea-water is of particular interest when the waves occurring in the-swelling water have been subjected to wind over very great distances (from hundreds to thousands of kilometers). Such waves may be present practically continuously at determined locations along a sea or ocean coast, wherein the wave length may amount to for instance 60 to 120 meters and the amplitude to for instance 1–3 meters.

It is generally known that variations in the pressure of swelling water decrease from the liquid surface in downward direction such that, at a depth corresponding with roughly half the wave length of the occurring waves, pressure variations are practically no longer detectable. This means that waves with a relatively small wave length have little influence on the dynamic hydrostatic pressure of the underlying water mass. Waves occurring during gales with a wave length of about 30 meters will for instance not penetrate to a depth further than about 15 meters. Pressure variations caused by a swelling water mass, wherein the wave length of the occurring waves amounts to for example about 130 meters will however be felt to a depth of about 65 meters.

It is an object of the invention to provide an installation of the type stated in the preamble, wherein the installation has a high performance, can extract energy from a swelling liquid with large wave lengths and can be placed on for instance the sea-bed.

SUMMARY OF THE INVENTION

The object of the invention is achieved with an installation of the type stated in the preamble of claim 1, comprising a first and second container for placing at a determined horizontal first mutual distance at least partially under the surface of the liquid, each provided with a closed upper side directed toward the liquid surface, closed side walls and an open underside directed toward the bottom for enclosing a gas under the liquid surface, wherein the gas is bounded to the underside of the container by a quantity of liquid entering via this underside, which quantity of liquid varies as a result of the swell, a transport conduit for transporting gas from the first to the second container and vice versa, and generator means responding to the variation in the quantity of liquid in at least one of the containers for generating energy from this variation.

In addition to the stated advantages, an installation according to the invention provides the advantage that when placed at comparatively great depth under water it is not very vulnerable, while placing under water already provides per se an aesthetic advantage.

The determined first distance between the first and the second container of an installation according to the invention is in preference substantially equal to half the wave length of the waves occurring in the swelling liquid.

With such a relation between the said first distance and the wave length of the occurring waves the performance with which energy can be extracted from the waves is highest.

The containers are more preferably movable in vertical direction through a determined second distance relative to the bottom by the effect of the upward forces exerted by the swelling liquid.

With such an installation it is possible to generate extra energy from the movement of the containers through the determined vertical second distance.

In an embodiment of an installation with containers movable in vertical direction through a determined second distance, this determined distance is smaller than the difference in height between a ridge and a depression of the waves occurring in the swelling liquid.

It has been found in such an installation that the second distance is sufficiently small to cause an up and downward movement of a container to take place through this distance within a period of one swelling wave at that location.

An embodiment of an installation according to the invention has the feature that the determined second distance is smaller than the difference in height between a ridge and a depression of the waves occurring in the swelling liquid.

In a preferred embodiment of an installation according to the invention each container is coupled for movement in a vertical direction to an upright pillar anchored on the bottom. In such an installation the containers are for instance mutually connected via their respective upper sides by the transport conduit.

An installation whereof each container is coupled for movement in a vertical direction to an upright pillar anchored on or in the bottom and whereof the containers are mutually connected via their respective upper sides by the transport conduit is characterized in a following embodiment by a third container similar to the first and second container and coupled for movement in a vertical direction to a third pillar anchored in the bottom, which third container is connected via its upper side by respective transport conduits to the first and the second container via the respective upper sides thereof. Such an installation has an exceptionally stable, mechanically strong construction.

In another embodiment of an installation according to the invention, wherein each container is coupled for movement in vertical direction to an upright pillar anchored on the bottom, the containers are mutually connected by the transport conduit via their respective undersides.

This latter installation preferably has the feature that a pillar debouches with its upper part into the interior of the container coupled to this pillar.

More preferably the installation has the feature that a pillar debouches with its upper part into a tube which is rigidly connected to the container and which extends through and from the upper side of the container vertically outside and inside the container, the top side of which tube is closed and the underside open, and of which the wall of the part extending inside the container is provided with apertures, wherein the tube and the pillar have forms such that the pillar fits into the tube and the tube is coupled to the pillar for vertical movement.

In these latter embodiments the transport conduit is for instance coupled to the respective pillars and mutually connects the containers via their respective undersides.

Yet another embodiment of an installation wherein each container is coupled for movement in vertical direction to an upright pillar anchored on the bottom is characterized by at least one subsequent container similar to the first and second container which is coupled for movement in vertical direction to a subsequent pillar anchored on the bottom, which subsequent container is connected by a respective transport conduit to at least the first or the second container.

It is further possible within the scope of the invention to form the wall of a container at least partially of flexible material. A flexible wall provides particular advantage when the generator means are driven by a gas which is transported via the transport conduit.

It is further possible within the scope of the invention that a container comprises a movable gas-tight partition between a gas for enclosing and an incoming liquid. Such a partition can for instance consist of a piston movable in the container or a flexible membrane connected gas-tightly to the walls. A gas-tight partition has the advantage that no gas dissolves in the liquid.

Yet another preferred embodiment is characterized in that due to a vertical movement of the container this latter also rotates, whereby the rotation direction of the container is independent of the vertical direction of movement. The rotation of the container can take place round a vertical axis as well as on a horizontal axis. A preferred embodiment of the invention for rotation of the container round a vertical axis is characterized in that the container is connected to the pillar anchored on the bottom with interposing of a guide, the guiding direction of which encloses over at least a part of the length an acute angle with the direction of the force of gravity. Another preferred embodiment of the invention for rotation of the container round a horizontal axis is characterized in that the container is connected with interposing of an arm to a horizontal shaft which is coupled rotatably to the pillar connected to the bottom. In this preferred embodiment a part of the energy generated during the vertical movement is converted into a turning movement of the container. At the dead moments of the vertical movement, i.e. an upper position where an upward movement is converted into a downward movement and a lower position where a downward movement is converted into an upward movement, the container will continue to rotate due to the mass inertia thereof. By now extracting energy from the rotating movement of the container it becomes possible to extract energy from the intermittent energy source (i.e. the swell) according to a more or less continuous pattern. It is also possible to increase the stroke length of the vertical movement compared to a non-rotating container.

The invention will now be elucidated further on the basis of embodiments, while reference is made to the drawings.

DESCRIPTION OF THE PREFERRED EMBODIMENTS

Figure 1:
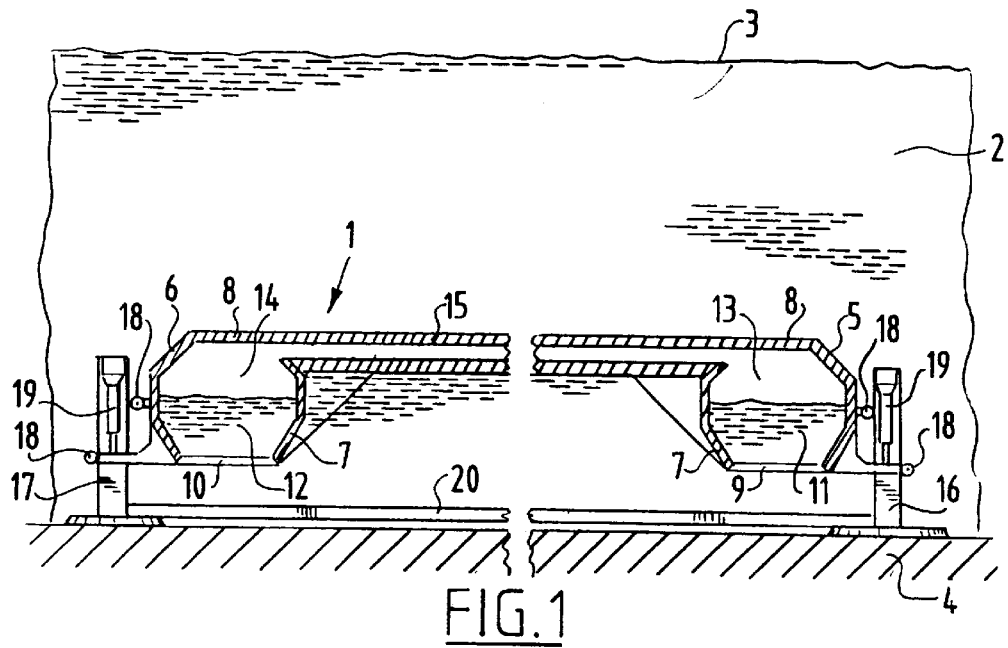
FIG. 1 shows an installation according to a first embodiment with two containers connected via their respective upper sides under a flat water surface.

FIG. 1 shows an installation 1 which is placed on the bottom 4 of a water mass 2 with a flat water surface 3. The installation comprises a first container 5 and a second container 6 respectively coupled to pillars 16 and 17 and connected via their otherwise closed upper side 8 by a gas transport conduit 15. Containers 5 and 6 comprise closed side walls 7 and open undersides 9 respectively 10, via which quantities of liquid 11, 12 respectively have entered the first and second containers 5, 6 respectively. The quantities of liquid enclose a quantity of gas 13 and 14 respectively in the first container 5 and second container 6. Containers 5 and 6 are coupled for movement in vertical direction with guides 18 to the respective pillars 16 and 17 such that hydraulic cylinders 19 are driven with the movement of containers 5, 6. Pillars 16, 17 are joined on their underside by a connecting arm 20.

Figure 2:
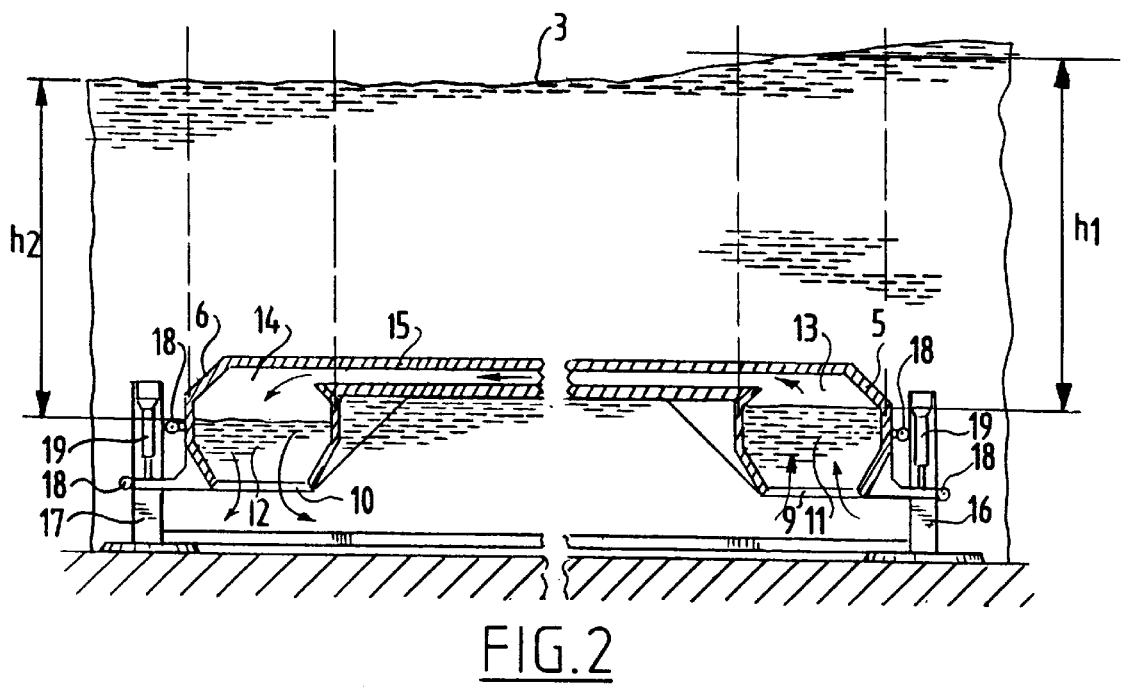
FIGS. 2–6 show the installation according to FIG. 1 under an undulating water surface during different stages of a wave of water travelling over the installation.

When now, as shown in FIG. 2, due to the occurrence of waves the distance $h_1$ from the liquid surface 3 to the level of the water mass 11 which has penetrated into the first container 5 is greater than the distance $h_2$ from the liquid surface 3 to the level of the water mass 12 which has penetrated into the second container 6, due to the resulting hydrostatic pressure difference the pressure on the gas 13 in the first container 5 will rise relative to the pressure on the gas 14 in the second container 6, as a result of which gas will be transported in the direction of the arrows via the transport conduit 15 from the first container 5 to the second container 6, wherein water enters container 5 via the underside 9 and water flows out of container 6 via underside 10. Due to the resulting weight increase of the first container 5 and the weight decrease of the second container 6 the first container 5 will want to sink, while the second container 6 will tend to start floating. The first container 5 will start a downward movement, guided herein along pillar 16 by guides 18, while the second container 6 starts an upward movement, guided herein along the second pillar 17 by runners 18. During the respective downward and upward movement of the first 5 and the second container 6 energy is generated using the hydraulic cylinders 19 driven by the respective containers 5, 6.

Figure 3:
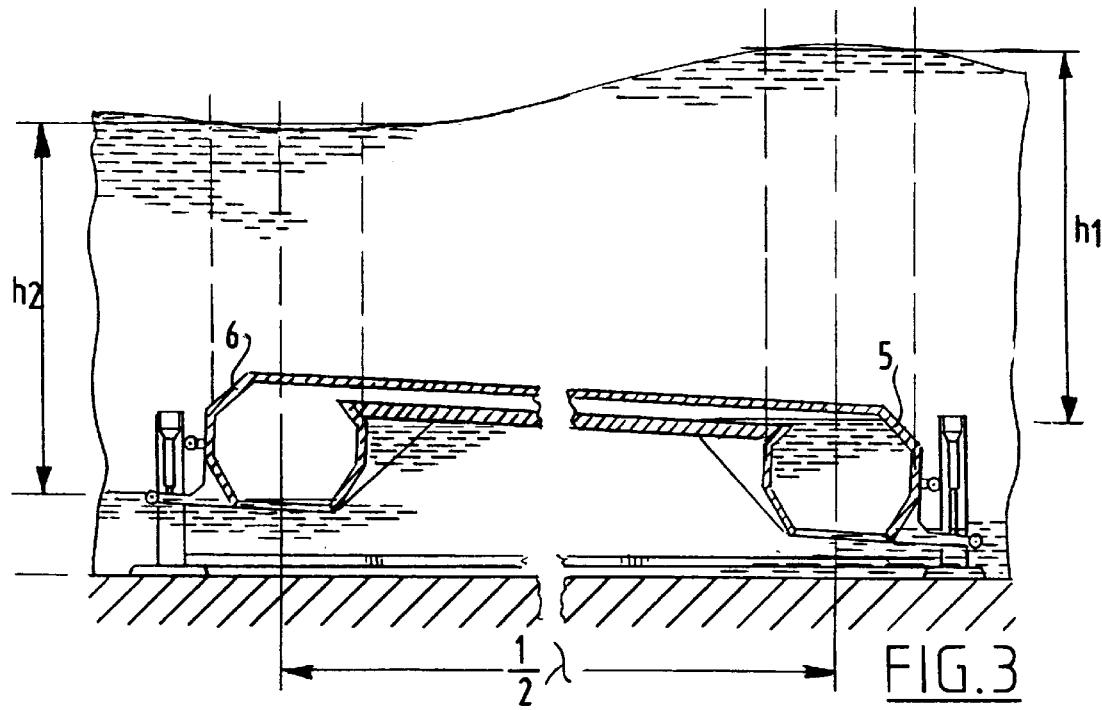

FIG. 3 shows the first container 5 and the second container 6 in their lowest respectively highest position at a moment when the first container 5 is situated precisely beneath the ridge and the second container 6 precisely beneath the depression of a wave and the heights $h_1$, and $h_2$, of the columns of water above the liquid levels of the water masses 11 and 12 in the respective containers 5 and 6 are precisely equal, so that the transport of gas from the first container 5 to the second container 6 and the transport of liquid in and out of the respective containers 5 and 6 has come to a standstill. FIG. 3 further shows that the horizontal distance between the first container 5 and the second container 6 is equal to half the wave length of the waves occurring in the swelling water mass. The height of containers 5 and 6 is chosen such that this is greater than the maximum occurring difference in level of the incoming quantity of water, so that under normal conditions (for instance excluding very violent storm) no water is transported via transport conduit 15 from the first container 5 to the second container 6 and vice versa.

Figure 4:
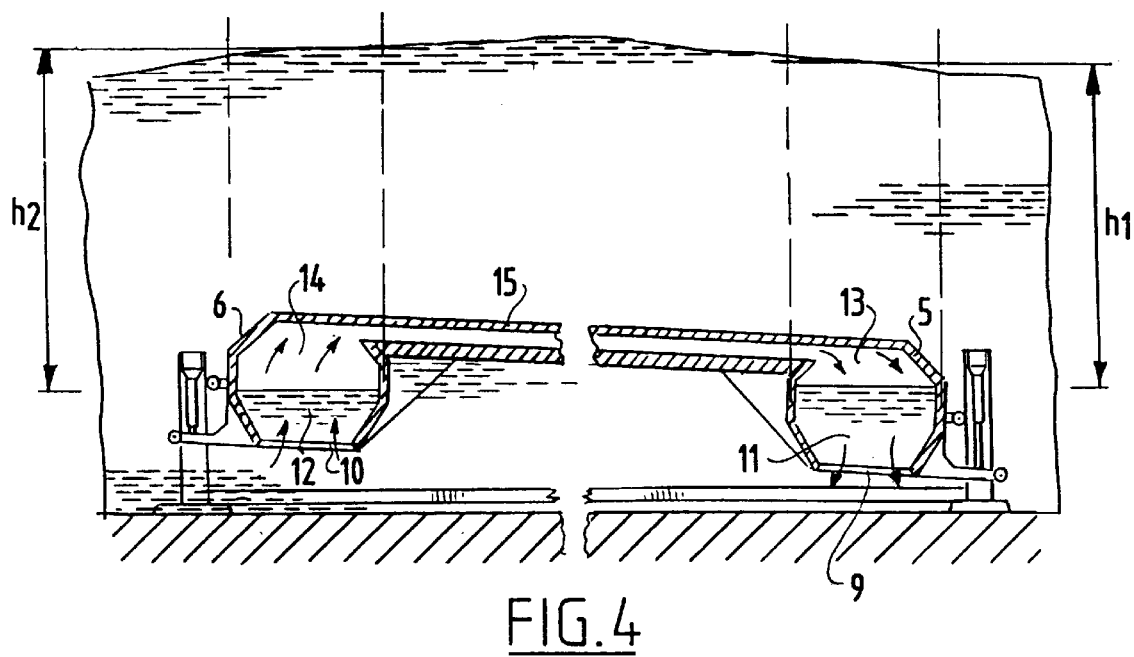

FIG. 4 shows the situation wherein the wave ridge of FIG. 3 has displaced further to the left, as a result of which the mean height of water column $h_2$ above the quantity of liquid 12 in the second container 6 is more than the mean height $h_1$ of the water column above the water mass 11 in the first container 5, as a result of which the pressure on the gas 14 in the second container 6 is higher than the pressure on the gas 13 the first container 5, so that gas transport via transport conduit 15 will take place in the direction designated by the arrows and water enters container 6 via opening 10 and water is pressed outside via the opening 9 of the first container 5.

Figure 5:
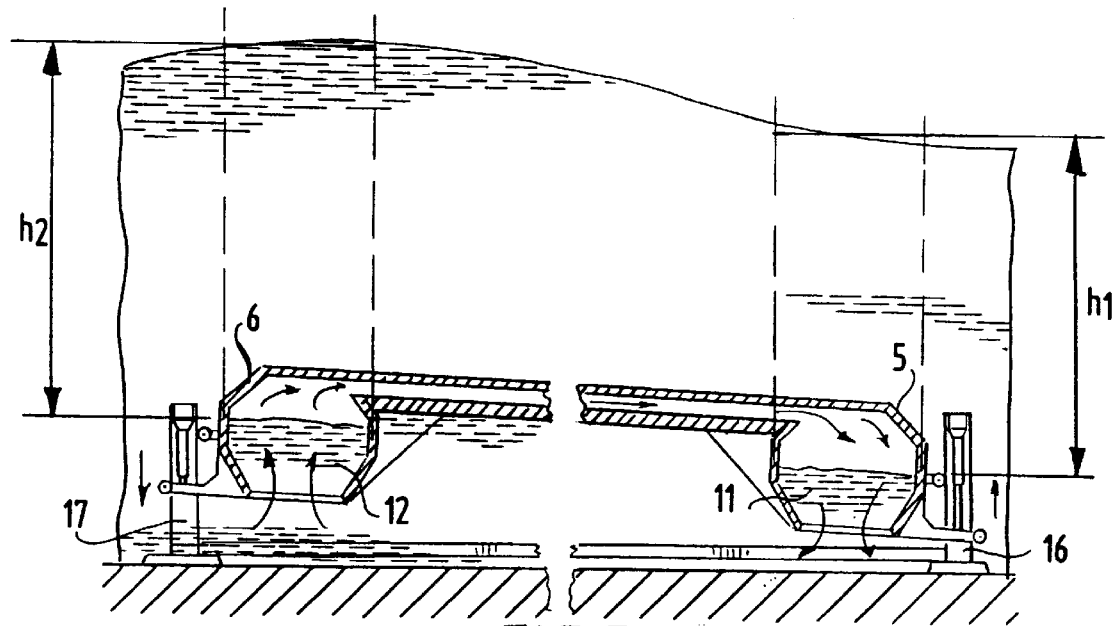

FIG. 5 shows that as a result of this water transport the weight of the first container 5 with contents 11 decreases and the weight of the second container 6 with contents 12 increases, whereafter the first container 5 becomes subjected to an upward pressure and the second container 6 becomes subjected to a downward pressure, as indicated by the vertical arrows along the respective pillars 16 and 17.

Figure 6:
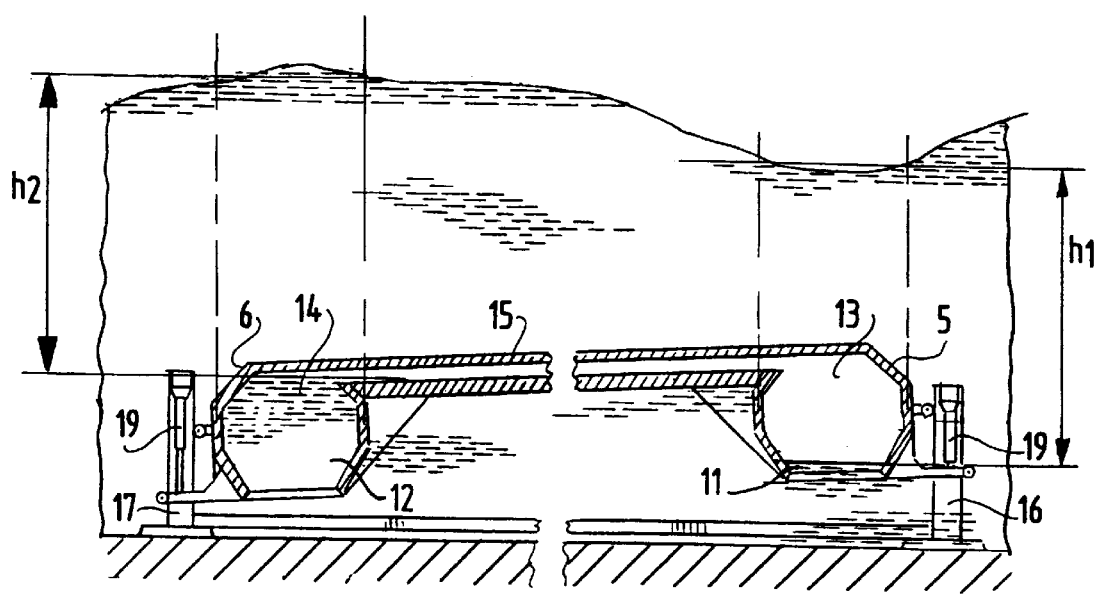

FIG. 6 shows the first container 5, from which practically all the water 11 has disappeared, in its highest position, and the second container 6, which is filled practically wholly with water 12, in its lowest position, while the mean height of water columns $h_1$ and $h_2$ above the quantities of liquid 11 and 12 in the respective containers 5 and 6 is the same, so that transport of gas no longer takes place from the second container 6 to the first container 5 via conduit 15 and the entry and exit of water respectively into the second container 6 and out of the first container 5 have ceased. The first container 5 is then situated precisely beneath a wave depression and the second container 6 is situated precisely beneath a wave ridge. As the wave above containers 5, 6 displaces further, the pressure on the gas 13 in the first container 5 will once again increase and the pressure on the gas 14 in the second container 6 will again decrease, as a result of which the gas is again transported from the first container 5 to the second container 6, water enters the first container 5 and water flows outside from the second container 6, as a result of which the first container 5 is again guided downward along the first pillar 16 and the second container 6 again moves upward along the second pillar 17 while energizing the hydraulic cylinders 19 with which energy is generated.

Figure 7:
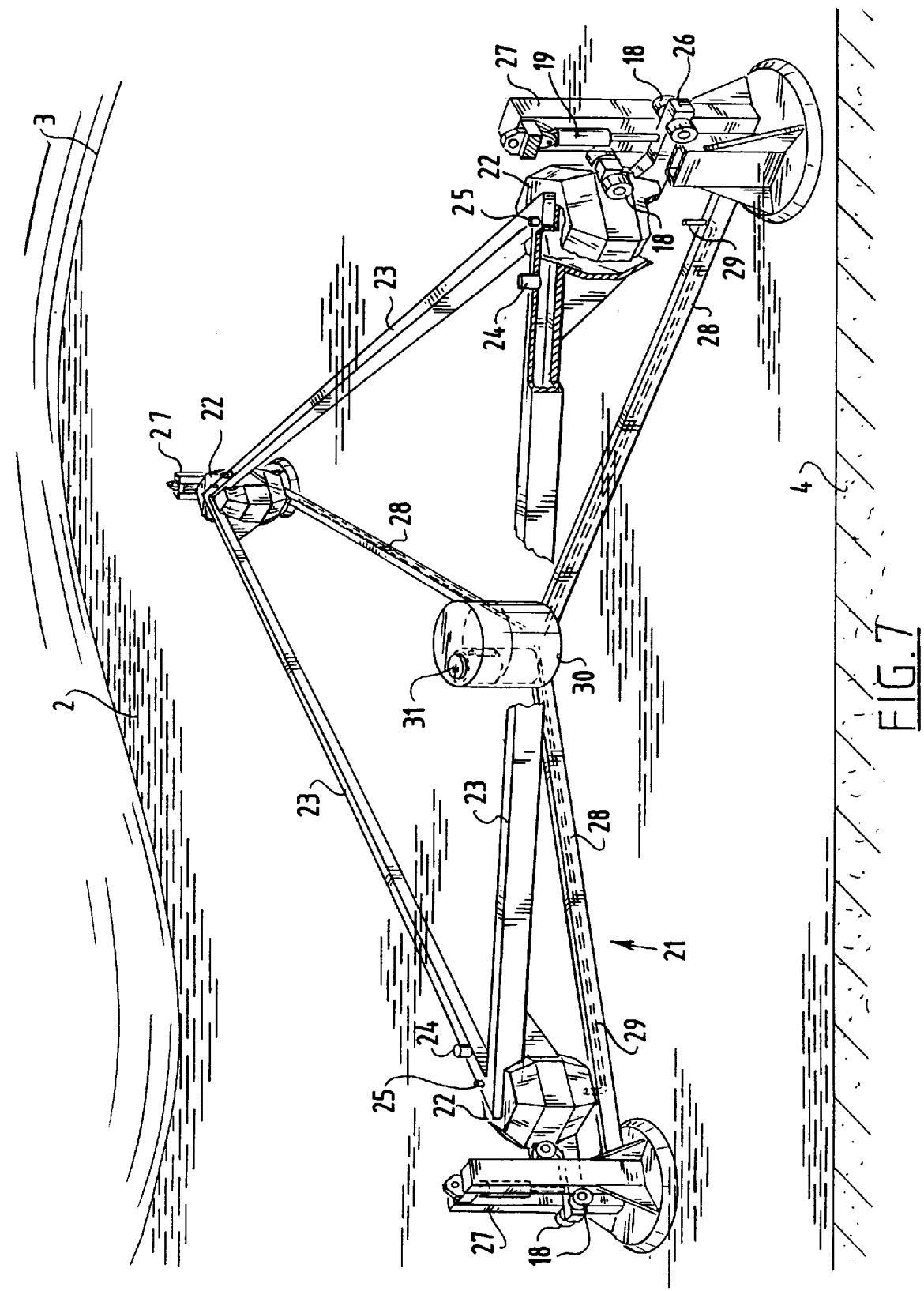
FIG. 7 shows an installation according to a second embodiment with three coupled containers connected via their respective upper sides.

FIG. 7 shows an installation 21 with three coupled containers of the type shown in FIGS. 1–6. Containers 22 are coupled via their respective upper sides by gas transport conduits 23 which are each provided with a venting valve 25 and with a balloon valve 25. With these latter the containers can be closed separately in the case the installation has to be brought to the surface, for instance for maintenance or repair operations. Containers 22 are coupled using guides 26 and runners 18 to upright pillars 27 for a movement in vertical direction along these pillars 27. During the movement of a container 22 in vertical direction a hydraulic cylinder 19 is again energized, whereby energy is generated. Pillars 27 are connected on their underside to tunnels 28 which run together in a control chamber 30, the interior of which can be reached via an access door 31. Incorporated in the tunnels 28 is for instance an air feed 29 so that in the case of an air shortage in containers 22 this shortage can be supplemented. A shortage can for instance occur because during violent storm too much water penetrates into the containers 22 or because in the course of time air from the containers 22 dissolves in the sea-water. Control chamber 30 comprises for instance a hydraulic control for hydraulic cylinders 19, a hydro-electric transformer for generating energy and control and measuring equipment.

Figure 8:
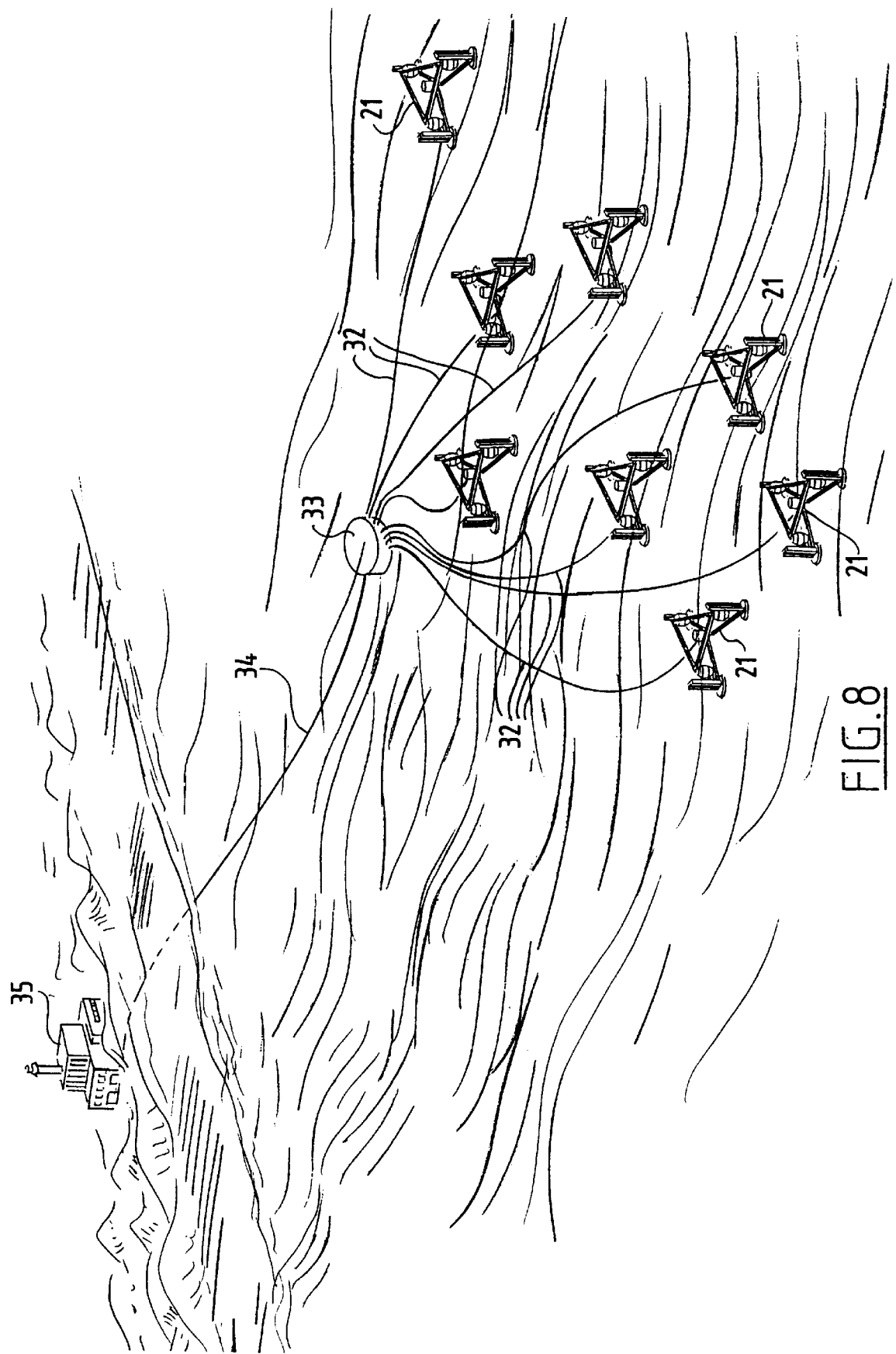
FIG. 8 shows a wave power plant with a number of installations according to FIG. 7.

FIG. 8 shows a wave power plant which comprises a number of electrically coupled installations 21 of the type shown in FIG. 7. The energy generated by the installations 21 is carried to an onshore coast station 35 via cables 32, the junction 33 located in the sea and a main cable 34. By positioning the installations 21 such that the wave ridges arrive successively at the location of these installations 21, it is possible to create a practically constant supply of energy.

Figure 9:
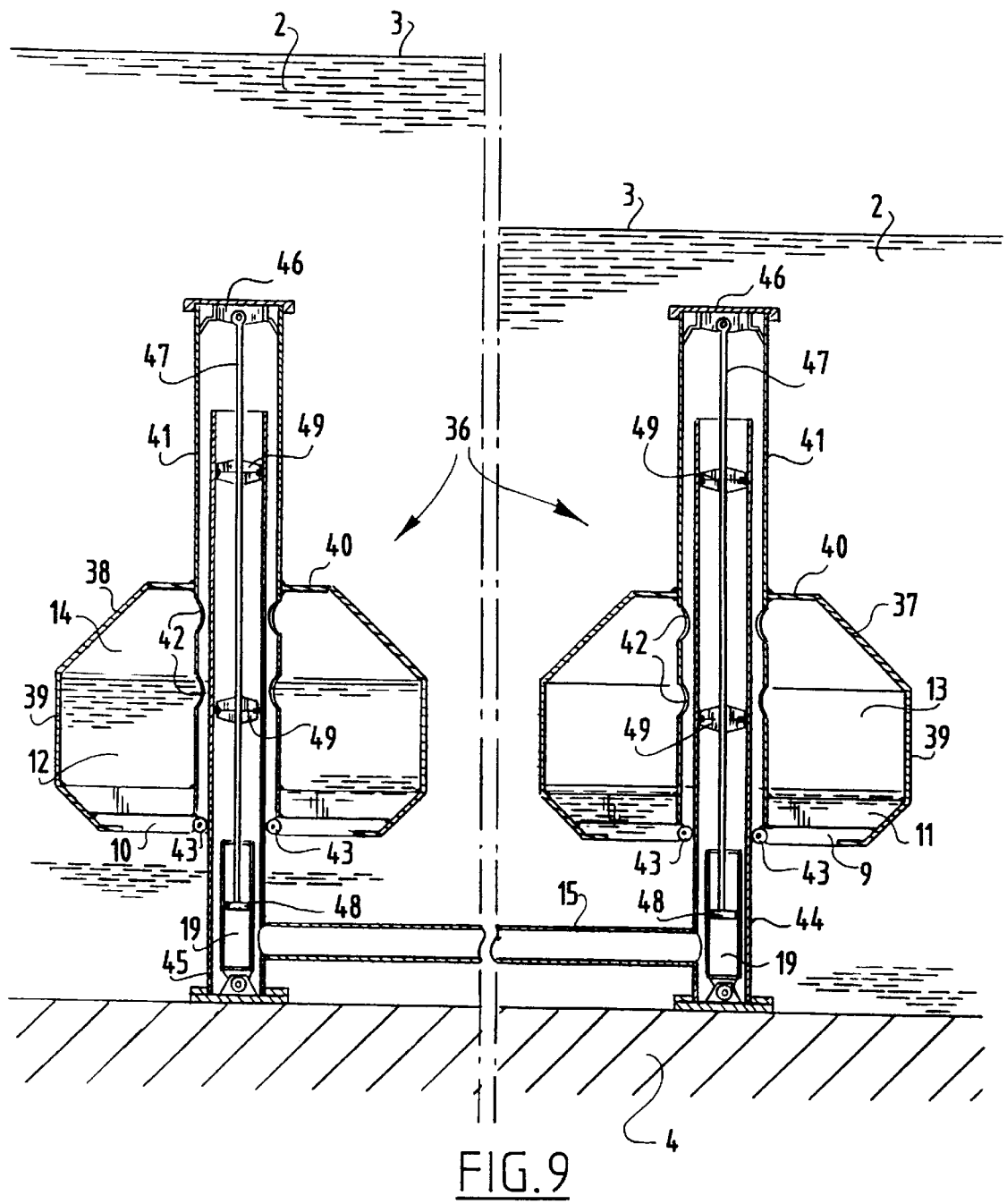
FIG. 9 shows an installation according to a third embodiment of the invention with two containers connected via their respective undersides.
Figure 10:
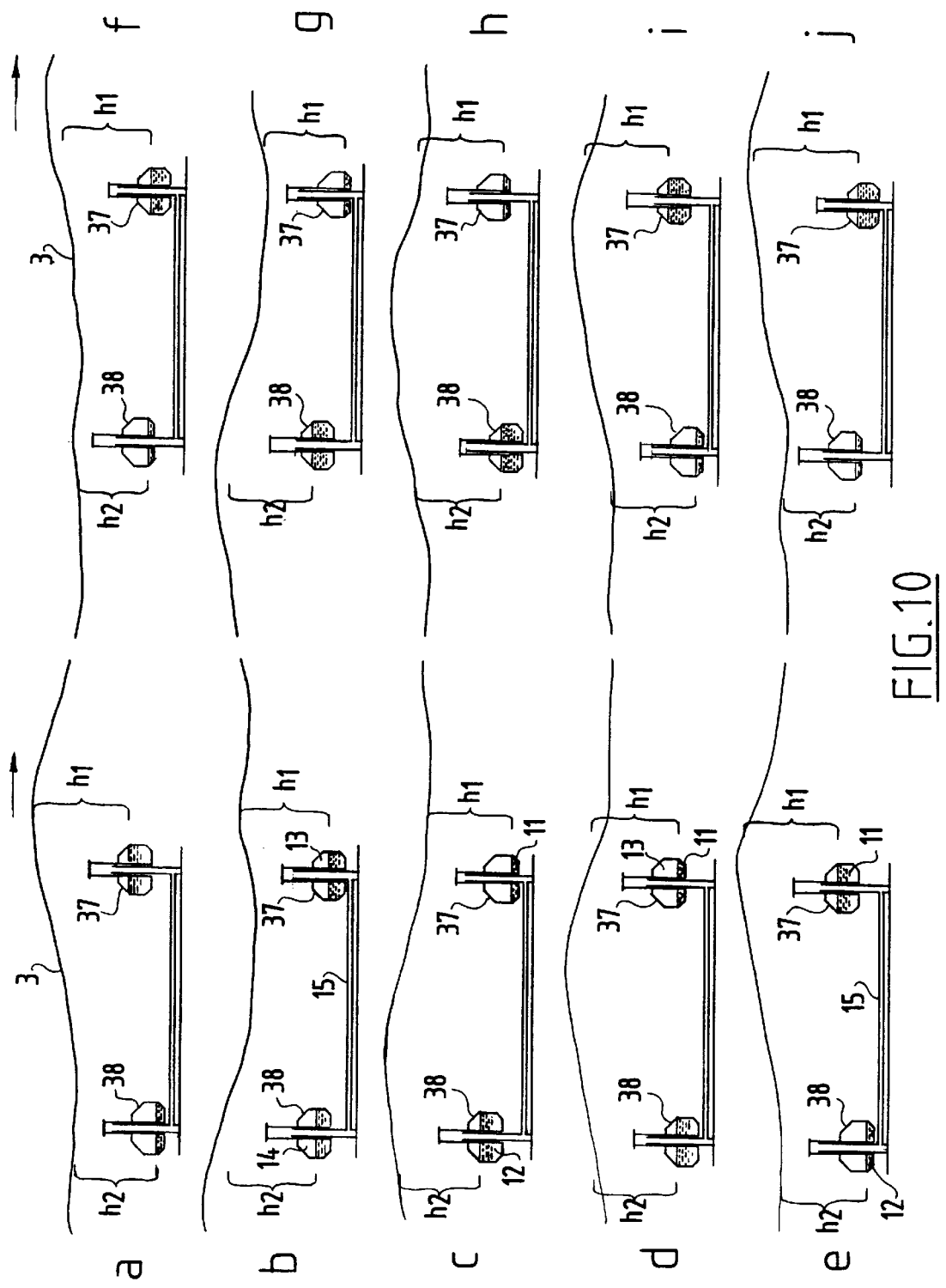
FIG. 10 shows an installation according to FIG. 9 under an undulating water surface during different stages of a wave of water travelling over the installation.

FIG. 9 shows an installation 36 according to a third embodiment of the invention with two containers 37, 38 coupled via their respective undersides 9, 10. Containers 37, 38 comprise closed side walls 39, an open underside 9 respectively 10 and a closed upper wall 40, to which is connected a tube 41 which extends through and from this upper side 40 vertically outside and inside the respective containers 37, 38. Tube 41 is in each case closed at its top 46 and is provided in the part extending in the respective containers 37, 38 with apertures 42. The first container 37 is movable in vertical direction along a first upright pillar 44 using guides 43 and the second container 38 is likewise movable along a second upright pillar 45 via guides 43. The upright pillars 44, 45 are open at their top and debauch into the tube 41 of the first container 37 respectively the second container 38 and are connected on their underside by a gas transport conduit 15. The respective tubes 41 are coupled with their respective tops 46 via a drive rod 47 to the piston 48 of a hydraulic cylinder 19 anchored to the sea-bed, using which energy is generated from the up and downward movement of the first 37 and second container 38 and the tubes 41 coupled thereto under the influence of occurring waves. The figure further shows internal guides 49 connected to the drive rods 47. Not shown in FIG. 9 are closing devices for closing the apertures 42 in order to prevent water entering the gas transport conduit 15. Such a closing device comprises for instance a vertically movable slide provided with a flexible material, for instance rubber, which is pressed by the water in a container onto the aperture 42 in tube 41, whereby the tube is closed. Such a slide is activated for instance during a storm when the occurring waves become so high that there is a danger of the installation 36 being wholly filled with water.

FIGS. 10a–j show successive stages of the operation of the installation 36 of FIG. 9 under the influence of a wave of water progressing in the direction of the arrow (to the right in the figure).

Under the influence of the hydrostatic pressure caused by a wave ridge the first container 37 in figure a is practically wholly filled with water and the second container 38 is practically wholly empty. As a result the first container 37 sinks and the second container 38 rises as shown in figure b. Because the wave ridge above the first container 37 has disappeared and a wave ridge begins to occur above the second container 38, the pressure on the gas 13 in the first container 37 decreases and the pressure on the gas 14 in the second container 38 rises, as a result of which gas is transported via conduit 15 from the second container 38 to the first container 37, while water 12 simultaneously flows into the second container 38 and water 11 flows out of the first container 37, as shown in figure c. A second wave ridge meanwhile approaches the first container 37, as a result of which the hydrostatic pressure exerted on the gas 13 in this container 37 increases, as a result of which gas is again transported via conduit 15 from the first container 37 to the second container 38 with simultaneous entry of water 11 into the first container 37 and exit of water 12 from the second container 38 as shown in figure d. Figure e shows the situation after the second wave ridge has passed over the first container 37 and therefore corresponds wholly with figure a. The movement of the first 37 and the second container 38 under the influence of the waves 3 as according to the successive figures f–j is therefore a repetition of the movement of the figures b–e and so on.

Like the embodiment of FIG. 1, the installation according to FIG. 9 can also be coupled to more than one similar installation using gas transport conduits 15. In the depicted embodiments energy is always extracted from the system using mechanically coupled hydraulic cylinders 19. It is however also possible to generate energy using turbines which are placed in the transport conduits 15 and driven by the gas flows through conduits 15.

Not shown in the figure are control means and blocking means for blocking the movement of the containers subject to the upward forces exerted on the containers by the liquid. Such control and blocking means have the advantage that it is hereby possible to permit the vertical movement of the containers only at the moment maximum filling is reached, so that the forces exerted on the containers are maximal and the energy to be generated from the movement of the containers is thus also maximal. These control means comprise for instance a force sensor for measuring the upward force on a container, or a liquid sensor for measuring the liquid level in a container.

Also not shown are pumping means for draining liquid out of the installation, in particular out of the transport conduit 15. Such a pump, and also the compressor for the air supply line 29 shown in FIG. 7, can be driven in exceptionally efficient manner using a vertically movable buoy connected to the installation. The pump and the compressor can of course also be driven using a diesel motor or an electric motor running on a battery powered by a solar collector.

Figure 11:
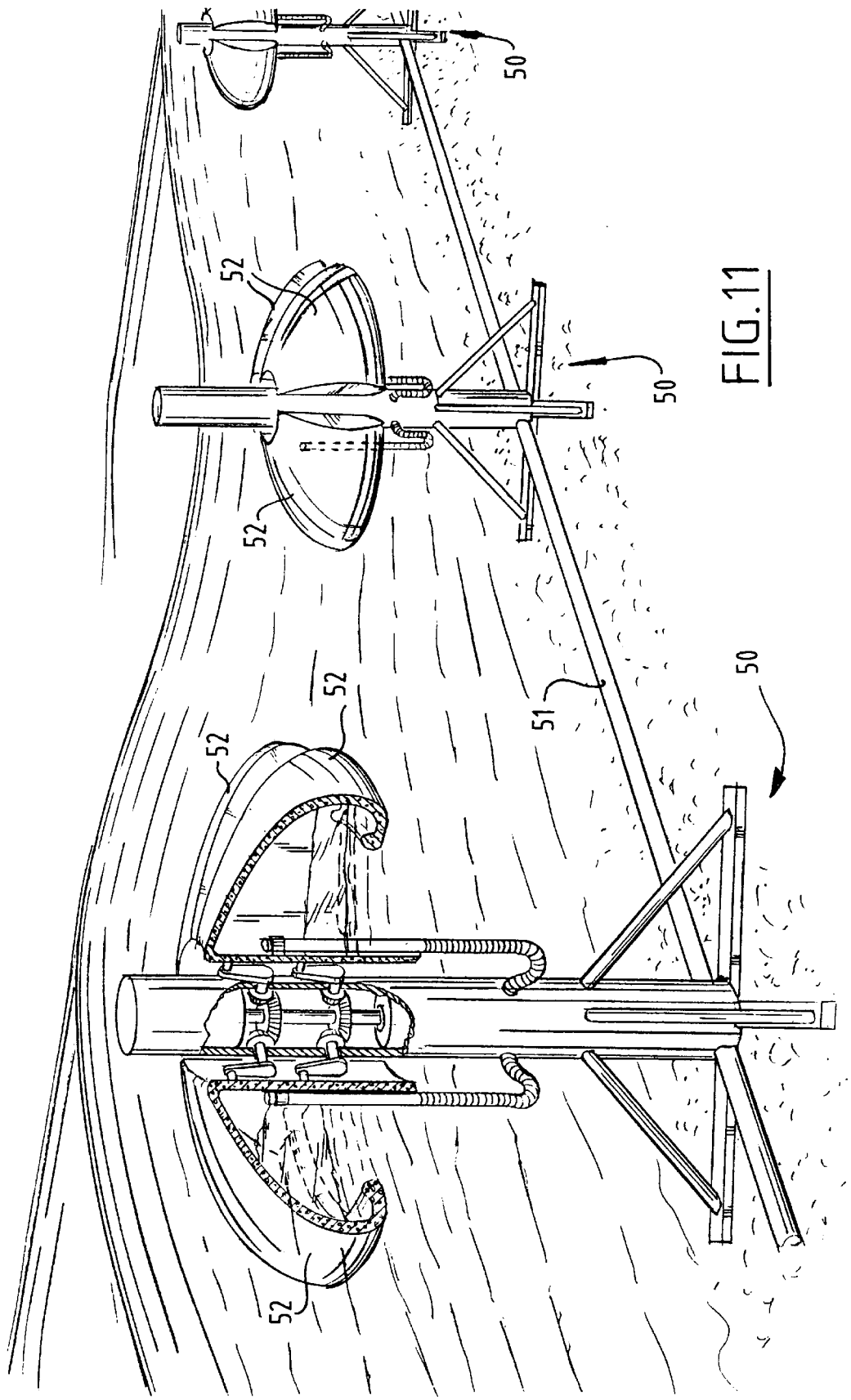
FIGS. 11–15 show installations whereof the containers, in addition to being vertically movable, are also rotatable on an axis.
Figure 12:
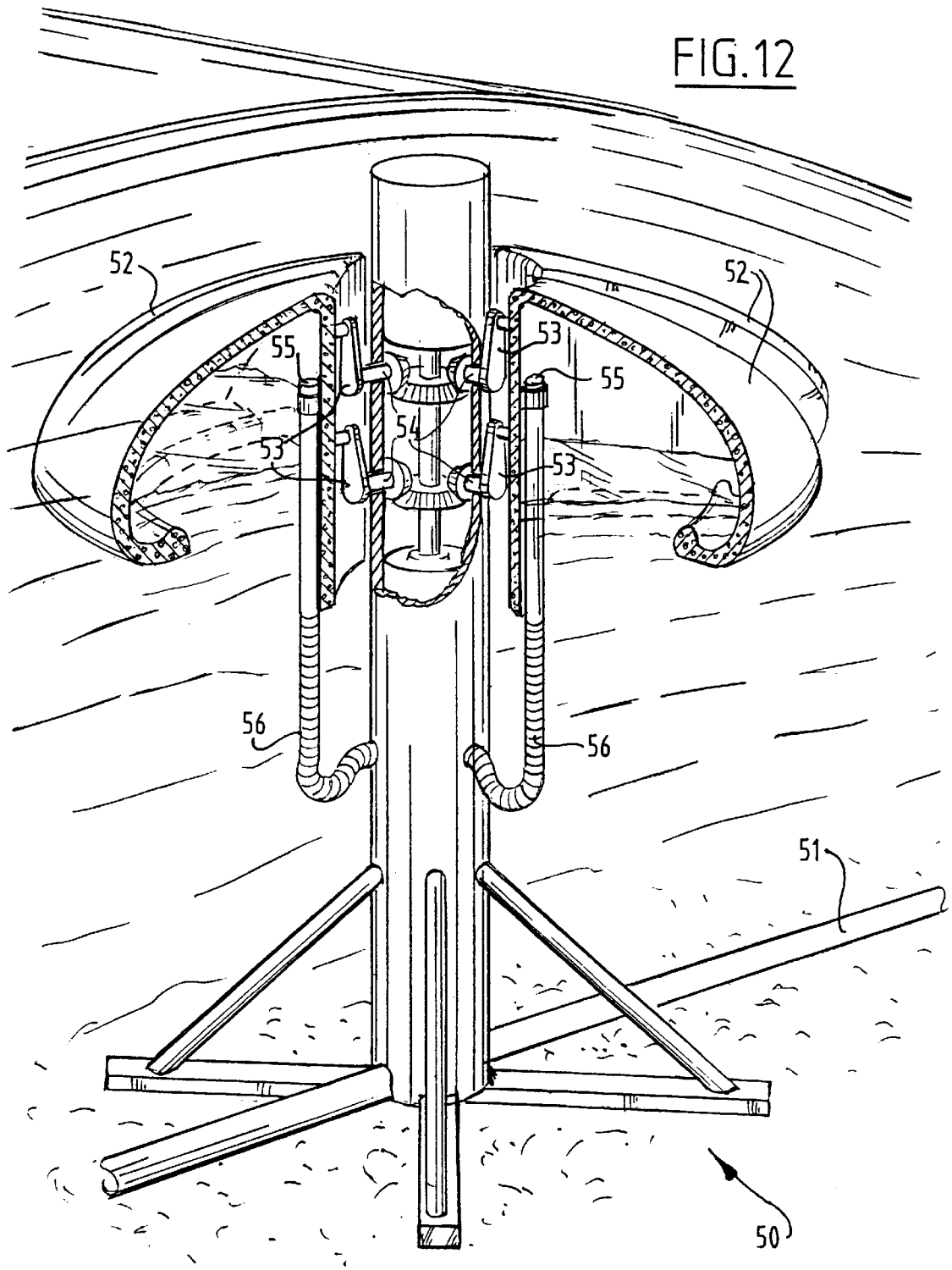

FIG. 11 shows a number of installations 50 mutually connected by gas transport conduits 51. The installations 50 each comprise a plurality of separate container segments 52. For a further description reference is made to FIG. 12 in which a detail of FIG. 11 is shown. The container segments 52 are connected, with interposing of arms 53, to horizontal rotation shafts 54. A vertical movement of container segments 52 is only possible when the arms 53 swivel round the rotation shafts 54. In this manner there results a rotation of container segments 52 round horizontal rotation shafts 54. A discharge and feed 55 for gas is connected to the gas conduit 51 with interposing of a flexible tube part 56.

Figure 13:
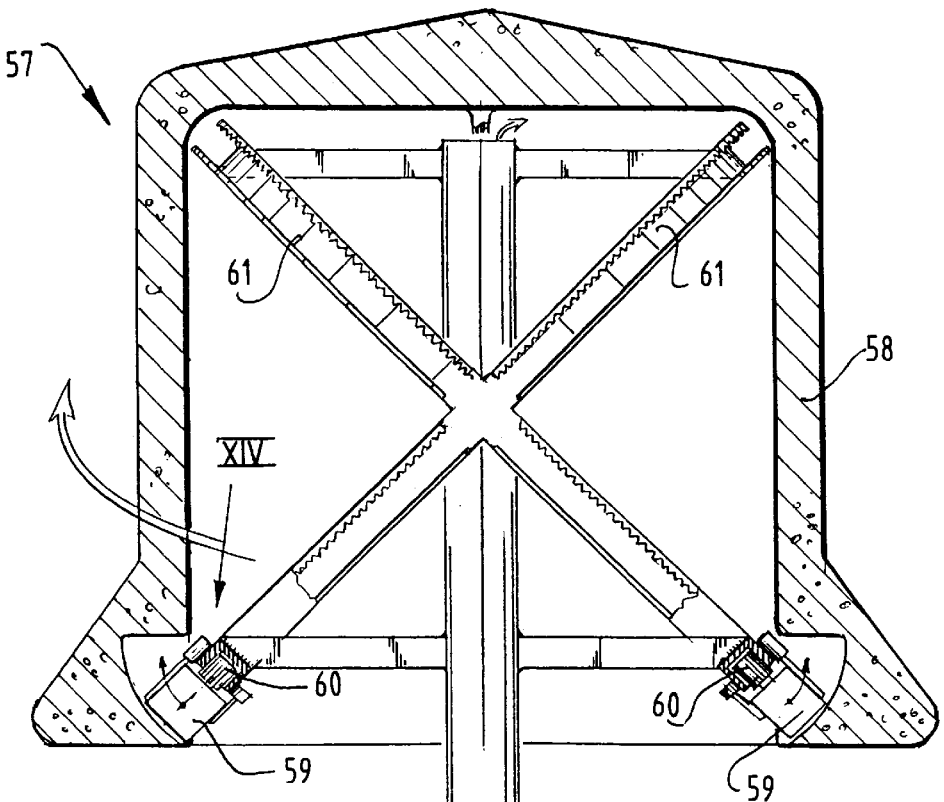

FIG. 13 shows an installation 57 in which generators 59 fixedly connected to a container 58 engage with interposing of runners 60 onto guide tracks 61 rigidly connected to a pillar 62. It is conceivable for the guide tracks 61 to have a position adjustable in relation to pillar 62. By varying the angle between the guide tracks 61 and pillar 62 it is possible to adapt the installation 57 to different wave heights. It is of course also possible to embody a similar installation with only one guide track 61 or more than the two guide tracks 61 shown here.

Figure 14:
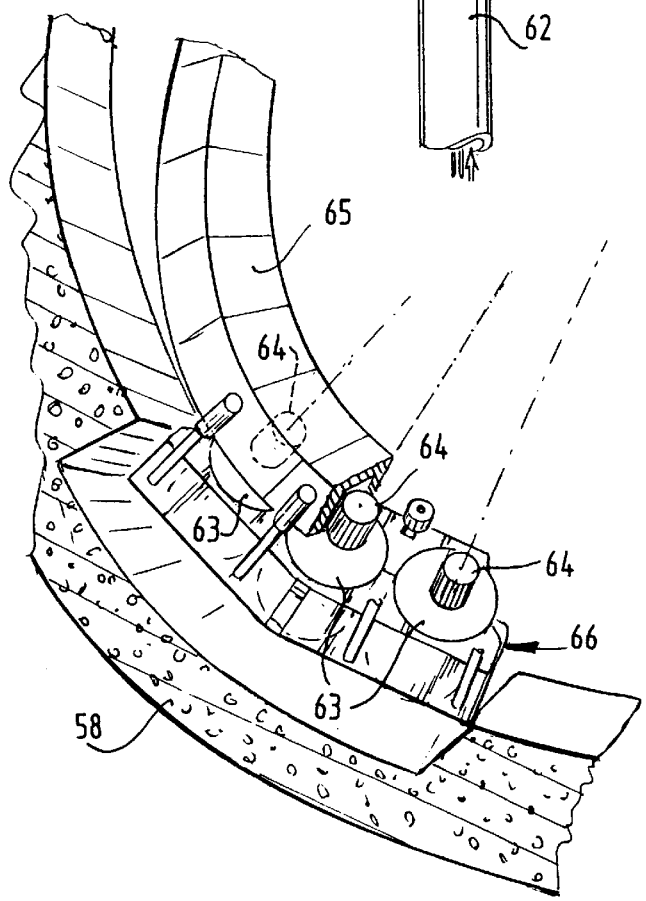

FIG. 14 shows in detail the edge of the container 58, wherein three generators 63 with associated runners 64 are arranged. The runners 64 co-act with a guide 65. For good operation the runners 64 must have some freedom of movement relative to container 58 and for this purpose the generators 63 are accommodated in a housing 66 which provides this freedom.

Figure 15:
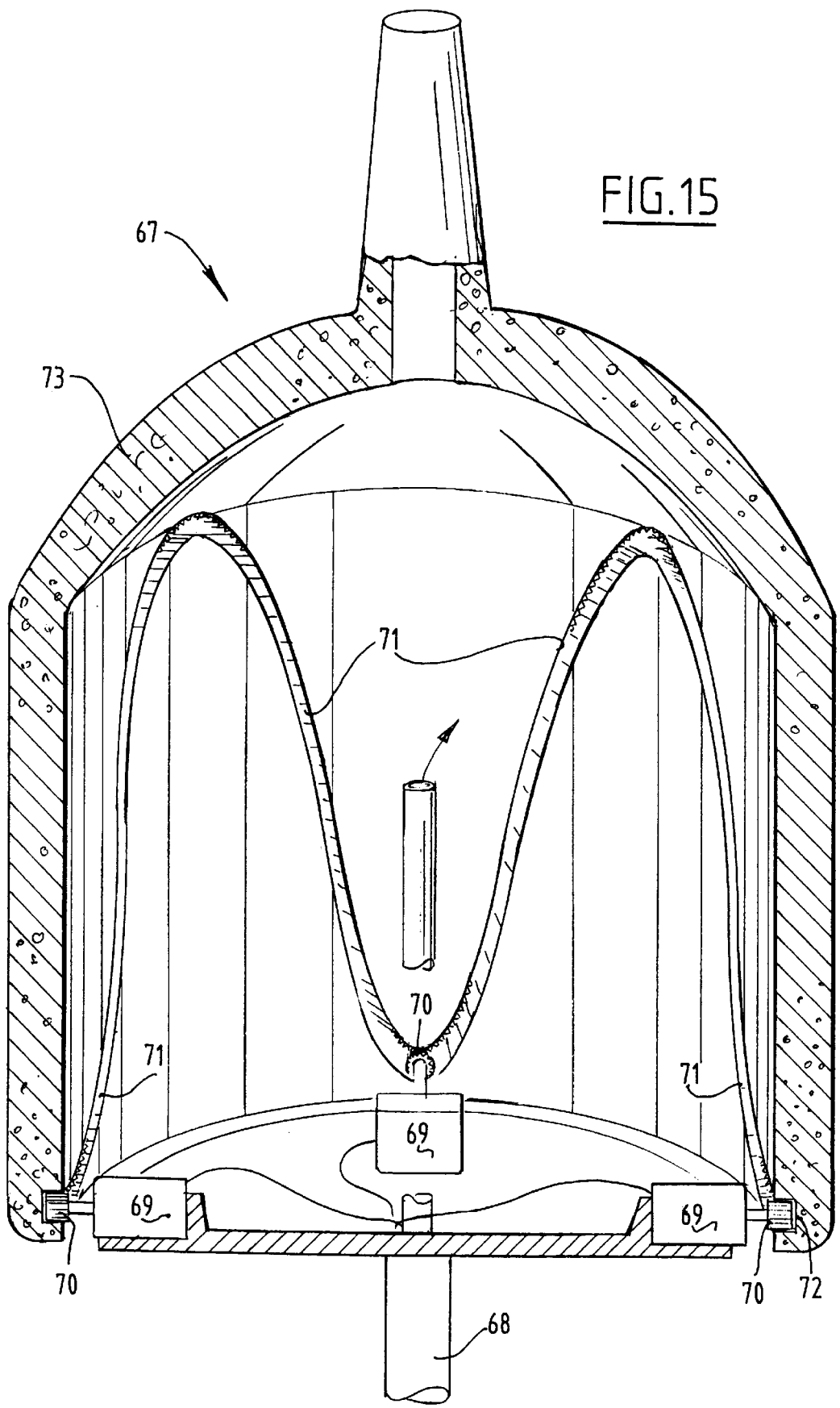

Shown schematically in FIG. 15 is an installation 67 wherein generators 69 rigidly connected to a pillar 68 engage with interposing of runners 70 onto a guide track 71 which is recessed as groove 72 in the inner wall of a container 73. Up to certain point this installation is thus the reverse of the installation 57 shown in FIG. 13. In FIG. 15 the generators 69 are rigidly disposed relative to a guide track 71 not rigidly connected to the pillar 68, while in FIG. 13 guide tracks 61 connected rigidly to the pillar 62 co-act with generators 59 not rigidly connected to pillar 62.

We claim:

1. An installation for extracting energy from a liquid in which swell occurs relative to a bottom, comprising:
    a first container, and second container spaced from each other at a substantially horizontal first mutual distance with the containers at least partially under a surface of the liquid, with each container provided with a closed upper side directed toward the liquid surface, closed side walls and an open underside directed toward the bottom, with the containers configured to enclose a gas under the liquid surface, wherein the gas is bounded on the underside of the container by a quantity of liquid entering via the underside of the container which quantity of liquid varies as a result of the swell;
    a transport conduit extending between the containers for transporting gas between the first container and the second container; and
    generator means responding to the variation in the quantity of liquid in at least one of the containers for generating energy from this variation,
    wherein both the first and second containers are movable in a vertical direction through a second distance relative to the bottom by upward forces exerted by the swelling liquid.

2. The installation as claimed in claim 1, wherein the first distance is substantially equal to half the wave length of waves occurring in the swelling liquid.

3. The installation as claimed in claim 1, wherein the second distance is less than a difference in height as measured from the bottom between a ridge and a depression of waves occurring in the swelling liquid.

4. The installation as claimed in claim 1, wherein the second distance is greater than the vertical distance between the upper side and the underside of the container.

5. The installation as claimed in claim 1, wherein each container is coupled for movement in the vertical direction to an upright pillar anchored on the bottom.

6. The installation as claimed in claim 5, wherein the transport conduit mutually connects the first and second containers via their respective upper sides.

7. The installation as claimed in claim 6, including a third container having an upper side and coupled for movement in the vertical direction to a third pillar anchored on the bottom, which third container is connected via its upper side by transport conduits to the first container and the second container.

8. The installation as claimed in claim 6, wherein the transport conduit mutually connects the containers via their respective undersides.

9. The installation as claimed in claim 5, wherein each pillar has an upper part which debouches into an interior of the container coupled to the pillar.

10. The installation as claimed in claim 9, wherein the transport conduit is coupled to the respective pillars and mutually connects the containers via their respective undersides.

11. The installation as claimed in claim 10, including at least one subsequent container coupled for movement in the vertical direction to a subsequent pillar anchored in the bottom, which subsequent container is connected by a transport conduit to at least one of the first and the second containers.

12. The installation as claimed in claim 1, wherein the generator means are driven by gas which is transported via the transport conduit under the influence of the variation of the quantity of liquid in at least one container.

13. The installation as claimed in claim 1, wherein at least one of the containers is mechanically coupled to the generator means.

14. The installation as claimed in claim 1, wherein the generator means comprise hydraulic cylinders.

15. The installation as claimed in claim 1, including control means and blocking means for blocking the movement of the containers subject to the upward forces exerted on the containers by the liquid.

16. The installation as claimed in claim 15, wherein the control means comprise a force sensor.

17. The installation as claimed in claim 1, including pumping means for draining liquid out of the installation.

18. The installation as claimed in claim 17, including a vertically movable buoy coupled to the installation for driving the pumping means.

19. The installation as claimed in claim 1, including gas supply means for feeding gas to the installation.

20. The installation as claimed in claim 19, including a vertically movable buoy coupled to the installation for driving the gas supply means.

21. The installation as claimed in claim 1, wherein a portion of at least one of the containers is formed at least partially of flexible material.

22. The installation as claimed in claim 1, wherein at least one container comprises a movable gas-tight partition between the gas and an incoming quantity of liquid.

23. An installation for extracting energy from a liquid in which swell occurs relative to a bottom comprising:

a first container and second container spaced from each other at a substantially horizontal first mutual distance with the containers at least partially under a surface of the liquid, with each container provided with a closed upper side directed toward the liquid surface, closed side walls and an open underside directed toward the bottom, with the containers configured to enclose a gas under the liquid surface, wherein the gas is bounded on the underside of the container by a quantity of liquid entering via the underside of the container which quantity of liquid varies as a result of the swell;

a transport conduit extending between the containers for transporting gas between the first container and the second container; and generator means responding to the variation in the quantity of liquid in at least one of the containers for generating energy from this variation, wherein the containers are movable in a vertical direction through a second distance relative to the bottom by upward forces exerted by the swelling liquid, wherein each container is coupled for movement in the vertical direction to an upright pillar anchored on the bottom, wherein each pillar has an upper part which debouches into a tube which is rigidly connected to the container coupled to the pillar and which extends through and from the upper side of the container vertically outside and inside the container, a top side of which tube is closed and an underside is open, and of which a wall of the part of the tube extending inside the container is provided with apertures, wherein the tube and the pillar are configured such that the pillar fits into the tube and the tube is coupled to the pillar for vertical movement.

24. The installation as claimed in claim 23, including a closing device for closing the apertures in the wall of the tube.

25. An installation for extracting energy from a liquid in which swell occurs relative to a bottom, comprising:

a first container and a second container spaced from each other at a substantially horizontal first mutual distance with the containers at least partially under a surface of the liquid, with each container provided with a closed upper side directed toward the liquid surface, closed side walls and an open underside directed toward the bottom, with the containers configured to enclose a gas under the liquid surface, wherein the gas is bounded on the underside of the container by a quantity of liquid entering the underside of the container, which quantity of liquid varies as a result of swell;

a transport conduit extending between the containers for transporting gas between the first container and the second container; and generator means responding to the variation in the quantity of liquid in at least one of the containers for generating energy from this variation, wherein due to a vertical movement of the container, the container rotates, with a rotation direction of the container being independent of the vertical direction of movement.

26. The installation as claimed in claim 25, wherein the container rotates round a vertical axis.

27. The installation as claimed in claim 25, wherein the container is connected to a pillar anchored on the bottom with interposing of a guide, a guiding direction of which encloses over at least a part of its length an acute angle with the direction of the force of gravity.

28. The installation as claimed in claim 25, wherein the container rotates round a horizontally situated axis.

29. The installation as claimed in claim 28, wherein the container is connected with interposing of an arm to a horizontal shaft which is coupled rotatably to a pillar connected to the bottom.

\* \* \* \* \*

UNITED STATES PATENT AND TRADEMARK OFFICE
CERTIFICATE OF CORRECTION

PATENT NO. : 5,909,060
DATED : June 1, 1999
INVENTOR(S) : Fred Ernest Gardner

It is certified that error appears in the above-identified patent and that said Letters Patent is hereby corrected as shown below:

```
Title Page, [56] References Cited, insert:
    --U.S. PATENT DOCUMENTS
       3,912,938    10/1975    Filipenco.....290/53
       4,288,985    09/1981    Dyck..........60/398
       4,341,959    07/1982    Ambli........290/53
       4,434,375    02/1984    Taylor.......290/53
       4,739,182    04/1988    Kenderi......290/54
       4,883,411    11/1989    Windle.......417/331
       5,084,630    01/1992    Azimi........290/53
       5,374,850    12/1994    Cowen........290/53--.

Column 1 Line 15 "the-swelling" should read --the swelling--.
```

Signed and Sealed this

Twenty-third Day of November, 1999

Attest:

Q. TODD DICKINSON

*Attesting Officer*     *Acting Commissioner of Patents and Trademarks*